United States Patent
Barroso (10) Patent No.: US 12,358,443 B2
(45) Date of Patent: Jul. 15, 2025

(54) HIGH-VOLTAGE CONNECTOR

(71) Applicant: JAGUAR LAND ROVER LIMITED, Coventry (GB)

(72) Inventor: Inaki Barroso, Leamington Spa (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 406 days.

(21) Appl. No.: 17/802,701

(22) PCT Filed: Feb. 24, 2021

(86) PCT No.: PCT/EP2021/054613
§ 371 (c)(1),
(2) Date: Aug. 26, 2022

(87) PCT Pub. No.: WO2021/170683
PCT Pub. Date: Sep. 2, 2021

(65) Prior Publication Data
US 2023/0114973 A1    Apr. 13, 2023

(30) Foreign Application Priority Data

Feb. 26, 2020   (GB) ...................................... 2002671

(51) Int. Cl.
| | |
|---|---|
| *B60R 16/02* | (2006.01) |
| *B60L 3/04* | (2006.01) |
| *H01R 13/621* | (2006.01) |
| *H01R 13/627* | (2006.01) |
| *H01R 13/66* | (2006.01) |

(52) U.S. Cl.
CPC ............ *B60R 16/0207* (2013.01); *B60L 3/04* (2013.01); *H01R 13/621* (2013.01);
(Continued)

(58) Field of Classification Search
CPC .. H01R 13/621; H01R 13/627; H01R 13/665; H01R 2201/26; H01R 13/707;
(Continued)

(56) References Cited

U.S. PATENT DOCUMENTS

| | | | | |
|---|---|---|---|---|
| 7,613,003 B2* | 11/2009 | Pavlovic | ............... | B60L 3/0069 361/709 |
| 8,597,043 B2* | 12/2013 | Zhao | ................... | H01R 13/707 439/352 |

(Continued)

FOREIGN PATENT DOCUMENTS

| | | |
|---|---|---|
| CN | 204424588 U | 6/2015 |
| CN | 205292301 U | 6/2016 |

(Continued)

OTHER PUBLICATIONS

International Search Report for PCT/EP2021/054613 dated May 19, 2021, 4 pages.

(Continued)

*Primary Examiner* — Renee S Luebke
*Assistant Examiner* — Paul D Baillargeon
(74) *Attorney, Agent, or Firm* — Troutman Pepper Locke LLP; Dustin B. Weeks; Nicholas H. Doss (57) ABSTRACT

Embodiments of the present invention provide a high-voltage connector comprising a first high-voltage connection interface comprising first and second high-voltage pins and first and second high-voltage interlock pins; a second high-voltage connection interface comprising third and fourth high-voltage pins and third and fourth high-voltage interlock pins and a high-voltage interlock connection interface, wherein the first high-voltage pin is electrically connected to the third high-voltage pin, the second high-voltage pin is electrically connected to the fourth high-voltage pin, the first high-voltage interlock pin is electrically connected to the third high-voltage interlock pin, and the second and fourth high-voltage interlock pins are electrically connected to the high-voltage interlock connection interface.

20 Claims, 5 Drawing Sheets (52) U.S. Cl.
CPC ......... *H01R 13/627* (2013.01); *H01R 13/665* (2013.01); *H01R 2201/26* (2013.01)

(58) Field of Classification Search
CPC .... H01R 31/005; H01R 31/06; H01R 31/065; B60R 16/0207; B60L 3/04
See application file for complete search history.

(56) References Cited

U.S. PATENT DOCUMENTS

| | | | |
|---|---|---|---|
| 8,888,535 B2* | 11/2014 | Knight | H01R 13/5221 |
| | | | 439/650 |
| 11,165,205 B2* | 11/2021 | Dube | H01R 13/187 |

FOREIGN PATENT DOCUMENTS

| | | |
|---|---|---|
| DE | 102016210721 A1 | 12/2017 |
| DE | 102016212029 A1 | 1/2018 |
| DE | 102019002307 A1 | 11/2019 |
| EP | 2730493 A1 | 5/2014 |
| WO | 2015113666 A2 | 8/2015 |

OTHER PUBLICATIONS

Written Opinion for PCT/EP2021/054613 dated May 19, 2021, 7 pages.
Combined Search and Examination Report for GB2002671.2 dated Aug. 26, 2020, 4 pages.

* cited by examiner

HIGH-VOLTAGE CONNECTOR

TECHNICAL FIELD

The present disclosure relates to a high-voltage connector, and particularly, but not exclusively, to a high-voltage connector for a high-voltage harness of a vehicle. Aspects of the invention relate to a high-voltage inline connector, a vehicle, and an inline connector body for a high-voltage inline connector.

BACKGROUND

In electric or hybrid vehicles it is known to connect high-voltage components directly to one another via a high-voltage harness. For example, a high-voltage harness may be provided between a high-voltage battery and a high-voltage component such as an inverter, and/or between an inverter and another high-voltage component such as a traction motor (electric machine). Depending on the relative locations of the different high-voltage components, the harness or harnesses may be quite long, and may cause problems during assembly of the vehicle. Accordingly, the need to provide a harness connecting high-voltage components has hitherto limited the design flexibility available to designers of electric or hybrid vehicles.

It is an aim of the present invention to address one or more of the disadvantages associated with the prior art.

SUMMARY OF THE INVENTION

Aspects and embodiments of the invention provide a high-voltage inline connector, a vehicle, and an inline connector body as claimed in the appended claims.

According to an aspect of the present invention there is provided a high-voltage inline connector comprising:
- a first high-voltage connection interface comprising first and second high-voltage pins and first and second high-voltage interlock (HVIL) pins;
- a second high-voltage connection interface comprising third and fourth high-voltage pins and third and fourth high-voltage interlock pins; and
- a high-voltage interlock connection interface;
- wherein the first high-voltage pin is electrically connected to the third high-voltage pin, the second high-voltage pin is electrically connected to the fourth high-voltage pin, the first high-voltage interlock pin is electrically connected to the third high-voltage interlock pin, and the second and fourth high-voltage interlock pins are electrically connected to the high-voltage interlock connection interface.

Using a high-voltage inline connector to connect two or more components of an electric vehicle allows for increased design flexibility, as it obviates the need to provide a long harness to connect components located at opposite ends of the vehicle. Furthermore, the high-voltage inline connector of the present invention allows for a high-voltage interlock loop to pass through the connector and be monitored via a high-voltage interlock connection interface on the inline connector. High-voltage electrical components for electric vehicles may be connected to a high-voltage interlock such that connection problems can be detected. Upon detection of a connection problem, the high-voltage interlock system will typically power down the high-voltage circuit. The high-voltage inline connector allows for a simple and secure connection and potentially obviates the need to provide a very long high-voltage harness.

In an embodiment the connector is formed in three parts, the three parts comprising:
- a first header;
- a second header; and
- an inline connector body;
- wherein the first header comprises the first high-voltage connection interface, the second header comprises the second high-voltage connection interface, and the connector body comprises the high-voltage interlock connection interface.

Use of first and second headers allows the external connections of the inline connector to be formed on parts that are already well validated for use in high-voltage vehicle systems.

In an embodiment, the first and second headers are attachable (or connectable, or mountable) to the connector body, such that when attached the first and third high-voltage pins are within a first pin bore of the inline connector body and the second and fourth high-voltage pins are within a second pin bore of the connector body, wherein the first and third high-voltage pins are electrically connected via a first busbar located in the first pin bore, and the second and fourth high-voltage pins are electrically connected via a second busbar located in the second pin bore.

In another embodiment, the first and second headers are attachable to the connector body, such that when attached, the first and third high-voltage pins are within a first pin bore of the inline connector body and the second and fourth high-voltage pins are within a second pin bore of the connector body, wherein the first high-voltage pin directly contacts the third high-voltage pin in the first pin bore and the second high-voltage pin directly contacts the fourth high-voltage pin in the second pin bore. In this embodiment, busbars connecting the high-voltage pins may not be required.

In an embodiment, the first header further comprises a fifth high-voltage pin, the second header further comprises a sixth high-voltage pin, and said the inline connector body comprises a third pin bore.

Allowing for the inclusion of three high-voltage pins on each header means that a high-voltage harness capable of handling alternating current in three different phases, as may be required for a connection between an inverter and an electric machine running on three phase current.

In an embodiment, each of the first and second headers comprise one or more high-voltage interlock pin bores, wherein each of the high-voltage interlock pins extends through one of the high-voltage interlock pin bores.

In an embodiment, the headers are connected to the inline connector by at least one of a bolt, rivet, over-centre clamp, latch or an adhesive. In some circumstances having a reversible connection means may be advantageous, as it allows for the connection to be broken by service personnel. However, in other embodiments a substantially permanent connection such as that provided by rivets or adhesive may be preferred.

In an embodiment, each of the first and second high-voltage connection interfaces comprises a flange arranged to locate an end connector of a high-voltage harness.

According to an aspect of the present invention there is provided a vehicle comprising a high-voltage inline connector as described above.

In an embodiment, the vehicle comprises a first high-voltage component having an associated first harness and a second high-voltage component having an associated second harness, wherein the first and second high-voltage components are connected to each other by connecting the first harness to the first high-voltage connection interface and connecting the second to the second high-voltage connection interface. Advantageously, use of the high-voltage connector obviates the need for a single harness to traverse the entire distance between the two high-voltage components.

The vehicle may be an electric vehicle or a hybrid electric vehicle.

In an embodiment, the connection between the first harness and the first high-voltage connection interface is releasable.

According to an aspect of the present invention there is provided an inline connector body for a high-voltage inline connector, the inline connector body comprising:
  a first mounting point;
  a second mounting point; and
  a high-voltage interlock connection interface;
  wherein:
    the first mounting point is arranged to have a first header mounted thereon and the second mounting point is arranged to have a second header mounted thereon;
    the first header comprises a first high-voltage connection interface comprising first and second high-voltage pins and first and second high-voltage interlock pins;
    the second header comprises a second high-voltage connection interface comprising third and fourth high-voltage pins and third and fourth high-voltage interlock pins; and
    when the first and second headers are mounted on the inline connector body, the first high-voltage pin is electrically connected to the third high-voltage pin, the second high-voltage pin is electrically connected to the fourth high-voltage pin, the first high-voltage interlock pin is electrically connected to the third high-voltage interlock pin, and the second and fourth high-voltage interlock pins are electrically connected to the high-voltage interlock connection interface.

Advantageously, such an inline connector body may allow a high-voltage inline connector for use within an electric vehicle to be formed by attaching headers to the inline connector body. Furthermore, this may allow the headers to be located on respective harnesses before the high-voltage inline connector is assembled.

The inline connector body may be provided with a first busbar arranged to connect the first high-voltage pin to the third high-voltage pin, and a second bus bar arranged to connect the second high-voltage pin to the fourth high-voltage pin when the first and second headers are mounted on the respective mounting points. Alternatively, the inline connector body may be arranged to cause the respective pins to directly contact each other when the headers are mounted on the inline connector body.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
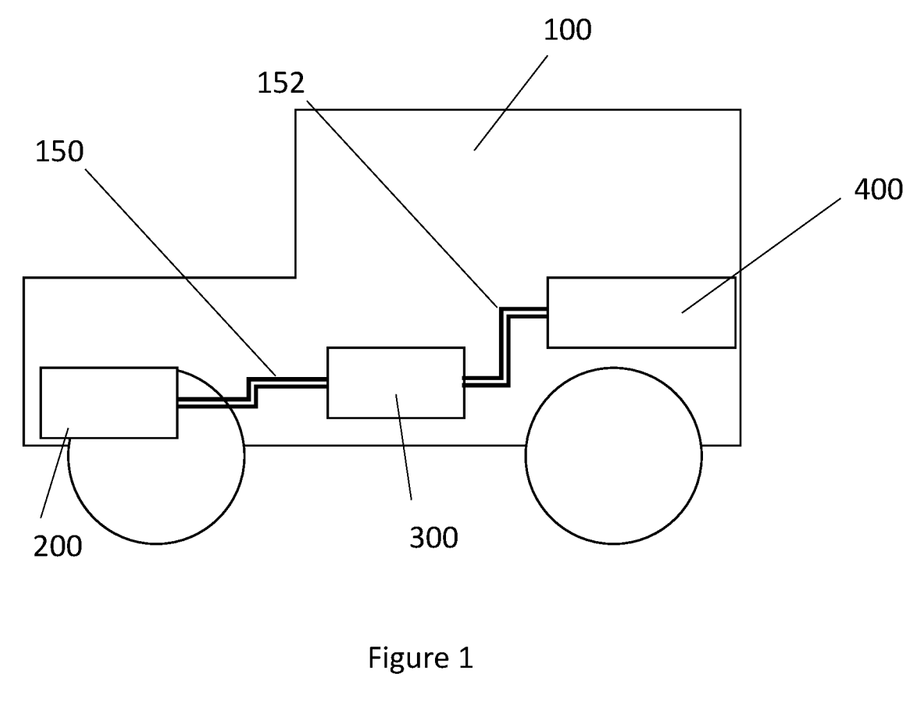
FIG. 1 shows a prior art electric vehicle architecture.

FIG. 1 shows a prior art electric vehicle 100 comprising three electrical components 200, 300, 400 connected via respective high-voltage harnesses 150, 152. In the illustrated example, the component 200 is a traction motor arranged to power one or more wheels of the vehicle 100, component 300 is a high-voltage inverter arranged to provide a three-phase alternating current to the traction motor 200, and component 400 is a high-voltage battery arranged to provide a high-voltage DC current to the inverter 300.

Due to safety concerns, the high-voltage components must have features which detect improper use, disconnection or faults. Typically, this is provided by connection to a high-voltage interlock loop. The purpose of the high-voltage interlock loop is to interconnect each of the high-voltage electrical components such that if one is deemed unsafe, comes uncoupled or is being repaired, each component connected to the high-voltage interlock loop is automatically discharged within a very short period of time. This helps to protect vehicle users and service personnel from potential electrocution hazards.

Figure 2:
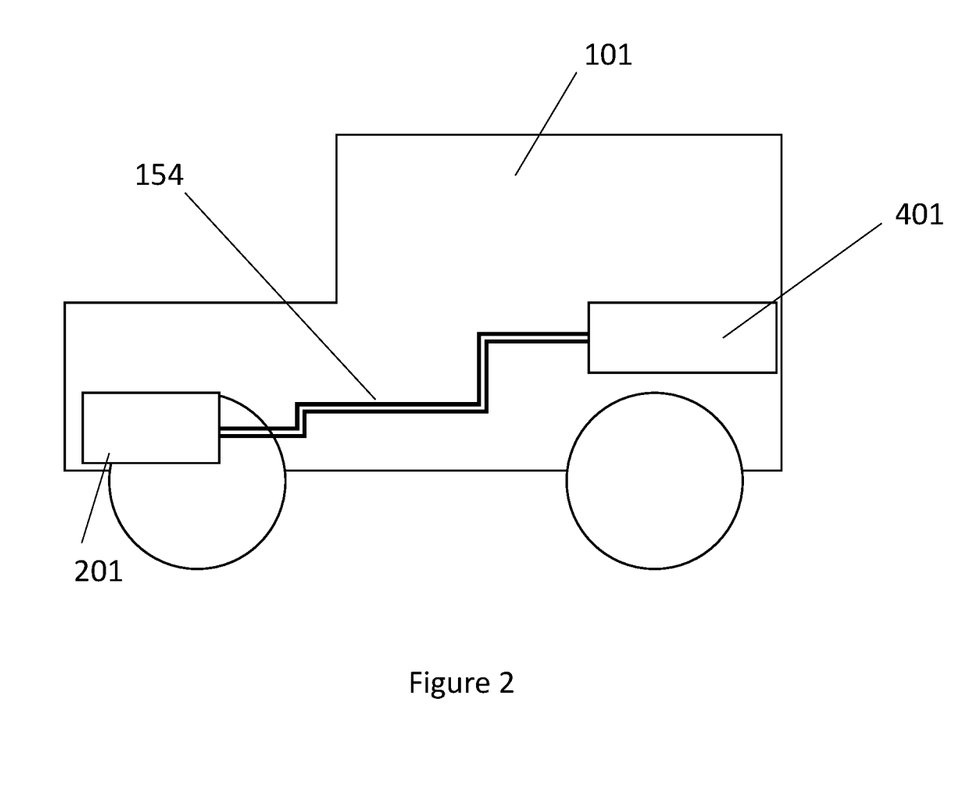
FIG. 2 shows another vehicle architecture.

FIG. 2 shows a further vehicle architecture, in which the high-voltage inverter is integrated within the same housing as the traction motor. As shown in FIG. 2, component 401 is a high-voltage battery and component 201 is a traction motor and integrated high-voltage inverter. A single harness 154 connects the components 201, 401. Because the component 201 is located towards the front of the vehicle 101 and the component 401 is located near the rear of the vehicle 201 underneath a trunk compartment, it is necessary for the harness 154 to traverse a substantial portion of the length of the vehicle.

The need to provide such a long harness can cause difficulties during assembly of the vehicle 101, partly because the harness itself can get in the way of other components, and also because provision of components connected by a single long harness makes it necessary to install the components 201, 401 at substantially the same time and at distant locations on the vehicle. Although it may be possible in some circumstances to install the high-voltage components without the harness, and only install the harness that connects them together later on in the assembly procedure, this may not be possible because the connection ports of the high-voltage components may be rendered inaccessible by the addition of further components.

Furthermore, if a single vehicle line includes variants with and without the high-voltage inverter 300 being integrated within the housing of the traction motor 200 (i.e. a variant having architecture similar to that shown in FIG. 1 and a variant having architecture similar to that shown in FIG. 2), it would be desirable for the other components and the assembly procedure to be changed as little as possible to accommodate this, as the need to provide large numbers of different components and different assembly procedures increases manufacturing complexity and production costs. Preferably, it would be possible to use the same or similar high-voltage harnesses for the vehicle models shown in FIGS. 1 and 2, and to install the components that are present on both vehicles at substantially the same point in the assembly procedure.

Figure 3:
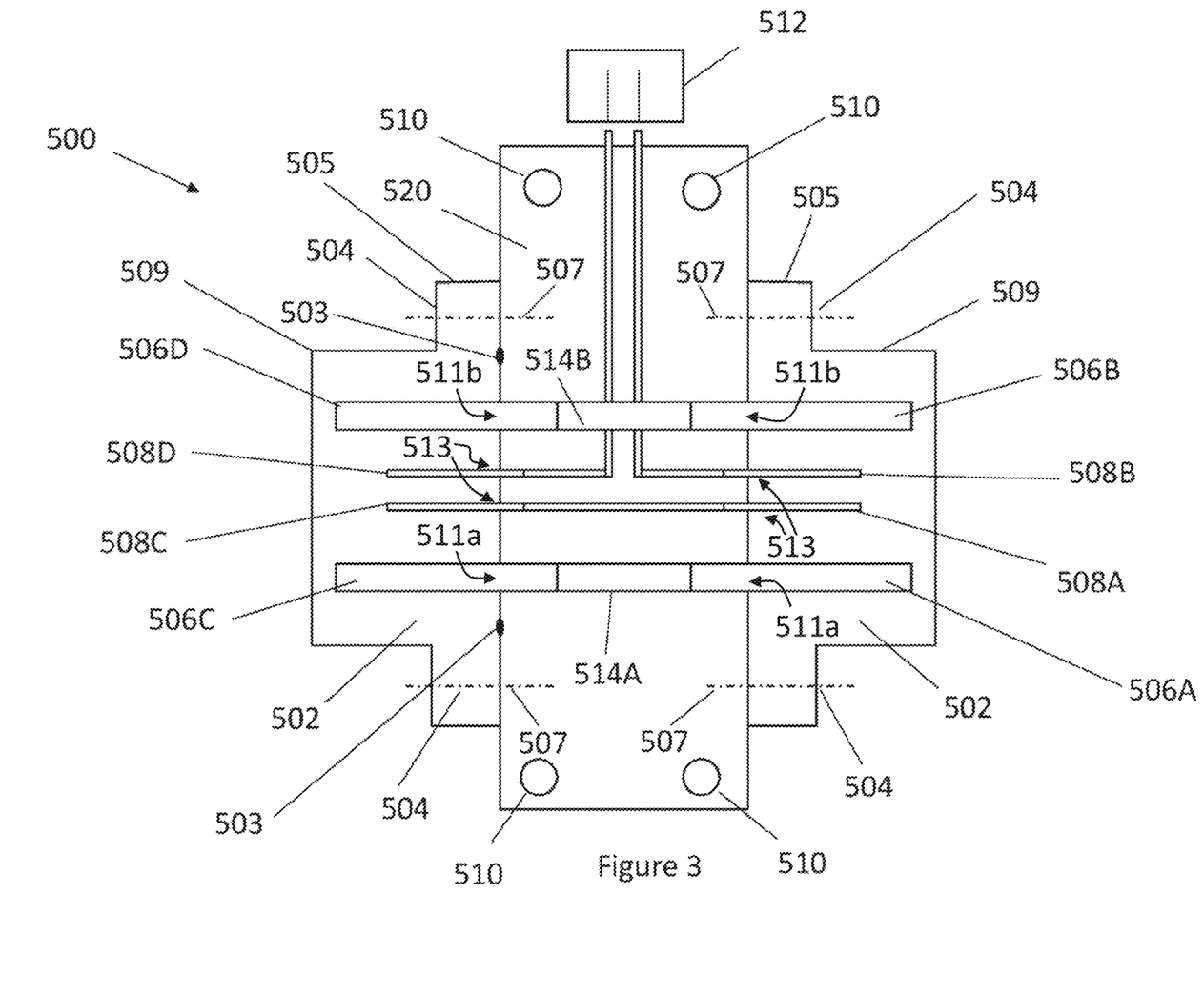
FIG. 3 shows a high-voltage inline connector assembly in an embodiment of the present invention.

FIG. 3 shows a high-voltage inline connector in the form of a high-voltage inline connector assembly (HVCA) 500 according to an embodiment of the present invention. In this embodiment the HVCA comprises two headers 502 which are releasably attachable to an inline connector body 520. Flanges 505 on the headers 502 comprise holes 504 for fixings such as screws, bolts or rivets to facilitate attachment. Corresponding holes 507 are also provided in the inline connector body 520. In an alternative embodiment, the holes are replaced by a surface which is suitable for attaching the headers 502 and the inline connector body using a suitable adhesive. In an alternative embodiment, the holes are replaced by a clamping mechanism to connect the headers 502 to the inline connector body 520. Such a clamping mechanism may be in the form of a latch or over-centre clamp. Each of the headers 502 are provided with a connection interface at which a high-voltage harness may be connected to the header. For example, the connection interface on each header 502 may comprise a flange 509 shaped to locate an end connector of a high-voltage harness. Accordingly, two high-voltage harnesses can be connected to one another via the HVCA.

The inline connector body 520 further comprises a plurality of holes 510 for attachment of the HVCA to the body of the vehicle, this may assist in the prevention of vibrations and forces, applied to the HVCA in the normal course of driving, from dislodging the HVCA from its intended location or position, or moving any components within, or associated with the HVCA.

FIG. 3 also shows how the HVCA allows for the electrical connection of two ends of high-voltage harnesses via a first high-voltage pin 506A, a second high-voltage pin 506B, a third high-voltage pin 506C, and a fourth high-voltage pin 506D (collectively the high-voltage pins 506A, 506B, 506C, 506D) and a first high-voltage interlock (HVIL) pin 508A, a second HVIL pin 508B, a third HVIL pin 508C, and a fourth HVIL pin 508D (collectively the HVIL pins 508A, 508B, 508C, 508D). The high-voltage pins 506A and 506C are electrically connected to one another through a first bus bar 514A, and the high-voltage pins 506B and 506D are electrically connected to one another via a second bus bar 514B. HVIL pins 508A and 508C are electrically connected to one another, thereby allowing a HVIL loop to pass through the HVCA via the first HVIL pin 508A and third HVIL pin 508C. The other two HVIL pins 508B and 508D do not connect directly to each other but form an output from the HVCA for connection to an interface 512, via which the HVIL loop can be monitored. In an embodiment, the interface 512 comprises a cover having a socket into which a separate connector can be inserted to connect to the low-voltage harness and allow monitoring of the HVIL loop. The socket may allow connection of the separate connector to the HVCA and the cover may provide ingress protection to protect the HVIL pins from contaminant and water ingress. However, in other embodiments the HVIL connection interface may instead simply comprise pins protruding from the HVCA. It will be understood that such pins may be connected to the low-voltage harness to allow monitoring of the HVIL loop via any suitable means.

As will be well understood by the skilled person, the HVIL loop passes through all of the HV components, and the entire HV circuit is powered down within a predetermined time period in the event that any part of the HVIL loop is broken. For example, the HV circuit may be powered down to a voltage of less than 60V DC or 30V AC (RMS) within 1 second in the event that the HVIL loop is broken.

The construction of the HVCA means that if either harness should become disconnected from the HVCA, all (or selected) high-voltage components will become discharged and safe for operatives to handle, because disconnection of the connector inevitably breaks the HVIL loop. This also prevents electrical arcing during disconnection of the connector, which would otherwise lead to oxidation of the connection surfaces, which may increase their resistance and potentially degrade performance.

The high-voltage harnesses can be connected to the first and second headers 502 by standard end connectors (not shown), thus creating a high-voltage electrical connection between a high-voltage harness connected to each of the headers 502.

Alternatively headers 502 may form the end of one or more of the high voltage harnesses for connection to the inline connector body 520.

There may also be a seal 503 (shown as an example on the left side header only) between the headers and the inline body to prevent the incursion or ingress of moisture into the HVCA. Similarly, when the harnesses are connected to the HVCA, a seal may be provided between each of the end connectors on the harnesses and the HVCA. The seals may be provided in any suitable form. For example, the seals may comprise one or more 'O' rings or deformable gaskets. The seal may be waterproof.

Figure 4:
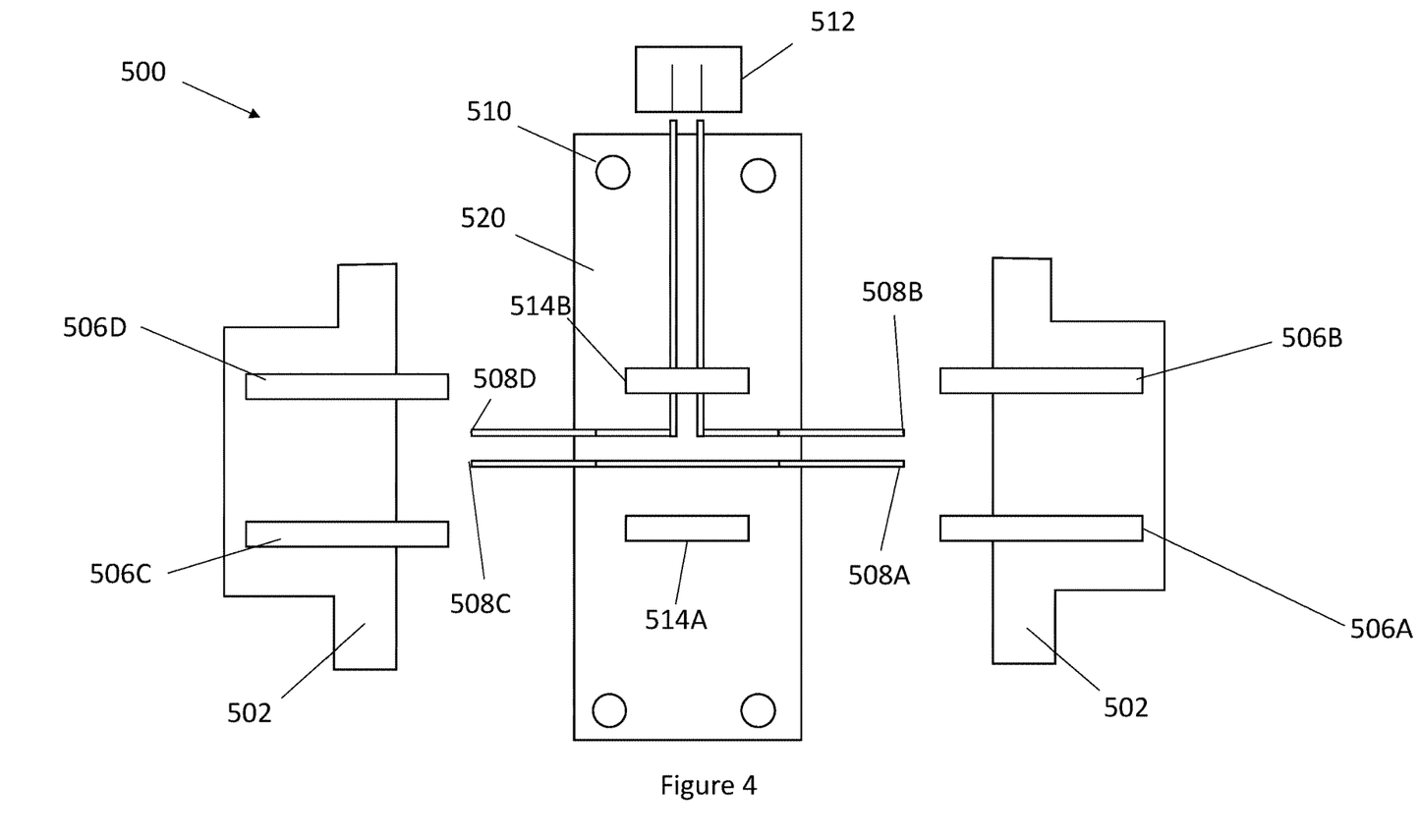
FIG. 4 shows a view of the high-voltage inline connector assembly shown in FIG. 3, with disconnected headers.

FIG. 4 shows a view of the HVCA prior to the headers 502 being connected to the inline connector body 520. Busbars 514 located within the inline body are used to connect the high-voltage pins in the two opposing headers to each other. The busbars 514 may be fixed within the inline connector body 520 by any suitable means, such as by bolting the busbars within the connector body, or by co-moulding the busbars within the connector body. Alternatively, the busbars may be located in bores 511$a,b$ (FIG. 3) within the inline connector body 520 and connected to pins by abutment such that the electrical connection is held in place by the bolts (or other fixings) which attach the headers 502 to the inline connector body 520. The HVIL pins are located in bores 513 (FIG. 3) which pass through each of the headers 520, generally parallel with the high-voltage pins. Headers which provide integrated high-voltage pins and bores through which HVIL pins can pass are commercially available and well validated for use in high-voltage vehicle systems. Indeed, it is a particular advantage of the present invention that, in some embodiments, a HVCA can be provided in which all of the high-voltage connection interfaces are provided by components that are already well validated and widely used.

Although FIG. 4 shows connections between the high-voltage pins 506A, 506B, 506C, 506D using first and second busbars 514A, 514B, it will be understood that in some embodiments the high-voltage pins may be long enough to directly contact each other when the headers 502 are attached to the inline connector body 520, thereby forming the required electrical connections between the first and third pins 506A, 506C and the second and fourth pins 506B, 506D. The busbars 514A, 514B may therefore be omitted in such embodiments.

In another alternative embodiment, the high-voltage pins may be provided within the inline connector body 520 rather than the headers 502, and the headers 502 may simply provide holes through which the pins may pass. Accordingly, in some embodiments, the first and third high-voltage pins may be formed by respective ends of a single conductor passing through the inline connector body, and the second and fourth high-voltage pins may also be formed by respective ends of another conductor passing through the inline connector body.

Figure 5:
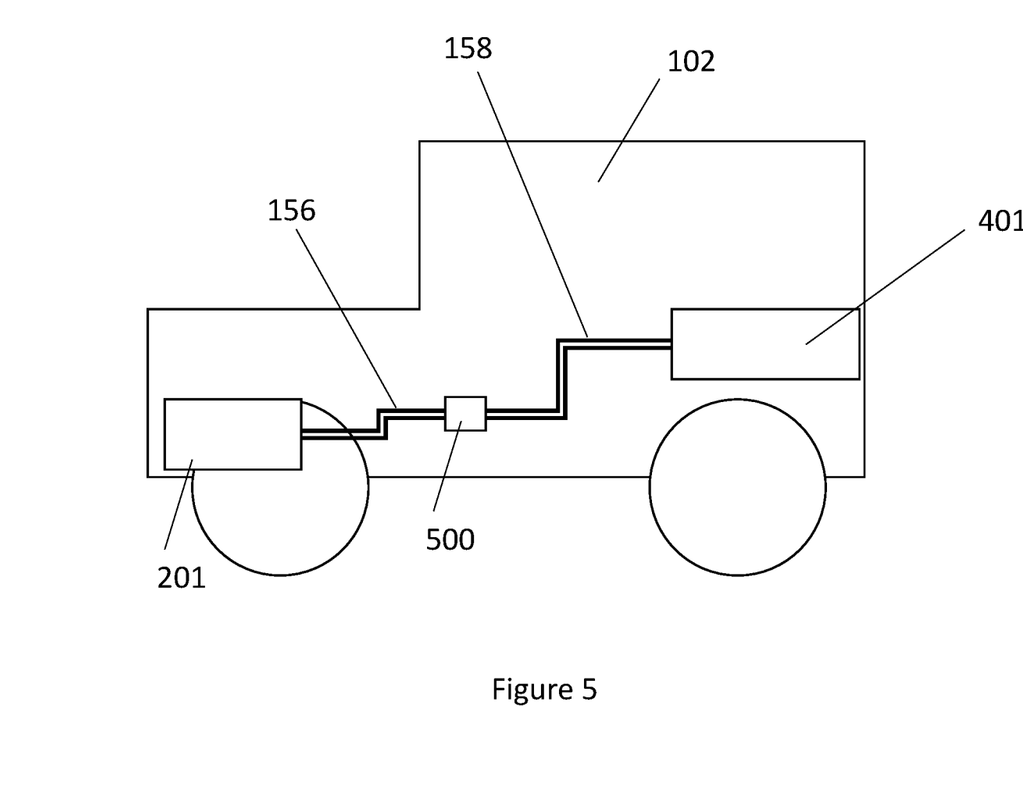
FIG. 5 shows a vehicle architecture in an embodiment of the present invention.

FIG. 5 shows a vehicle 102 comprising the HVCA 500 shown in FIGS. 3 and 4, and two high-voltage components 201, 401. For example, the component 201 may be a traction motor having an integrated inverter, and the component 401 may be a high-voltage battery. Each of the components 201, 401 is connected to the HVCA 500 via a respective harness 156, 158, and the connection between the components 201, 401 is completed once both harnesses 156, 158 are connected to the HVCA. The inclusion of the HVCA 500 allows for a connection to be made between the components 201, 401, without the need to provide a very long harness that may cause manufacturing difficulties.

A variant of the vehicle shown in FIG. 5 could have a further high-voltage electrical component in place of the HVCA, in which case the HVCA would not be needed on that particular variant. However, use of the HVCA on the variant shown in FIG. 5 helps to minimise the changes to the required components and the manufacturing process between the two model variants. Without the HVCA the harnesses between components 401 and 201 would need to be different for each variant of the vehicle, and the assembly procedure may differ substantially between the two variants. With the HVCA, the manufacturing process for the vehicle shown and variants could be streamlined, with potentially all but one or two of the components being the same.

Whilst the foregoing embodiments describe a high-voltage connector for a high-voltage harness of a vehicle, such a high-voltage connector could also be used for other high-voltage applications, such as for connection of vehicle charging infrastructure, or other applications, where there may be a risk of electrocution of a user or service personnel.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A high-voltage inline connector, comprising:
    a first high-voltage connection interface comprising first and second high-voltage pins and first and second high-voltage interlock pins;
    a second high-voltage connection interface comprising third and fourth high-voltage pins and third and fourth high-voltage interlock pins; and
    a high-voltage interlock connection interface;
    wherein the first high-voltage pin is electrically connected to the third high-voltage pin, the second high-voltage pin is electrically connected to the fourth high-voltage pin, the first high-voltage interlock pin is electrically connected to the third high-voltage interlock pin, and the second and fourth high-voltage interlock pins are electrically connected to the high-voltage interlock connection interface,
    wherein the high-voltage inline connector is formed in three parts, the three parts comprising:
        a first header;
        a second header; and
        an inline connector body;
    wherein the first header comprises the first high-voltage connection interface, the second header comprises the second high-voltage connection interface, and the connector body comprises the high-voltage interlock connection interface; and
    wherein the first and second headers are attachable to the inline connector body, such that when attached the first and third high-voltage pins are within a first pin bore of the inline connector body and the second and fourth high-voltage pins are within a second pin bore of the inline connector body, wherein the first and third high-voltage pins are electrically connected via a first busbar located in the first pin bore, and the second and fourth high-voltage pins are electrically connected via a second busbar located in the second pin bore.

2. The high-voltage inline connector of claim 1, wherein the first header further comprises a fifth high-voltage pin, the second header further comprises a sixth high-voltage pin, and the inline connector body comprises a third pin bore.

3. The high-voltage inline connector of claim 1, wherein each of the first and second headers comprise one or more high-voltage interlock pin bores, wherein each of the high-voltage interlock pins extends through one of the high-voltage interlock pin bores.

4. The high-voltage inline connector of claim 1, wherein the headers are connected to the inline connector by at least one of a bolt, rivet, over-centre clamp, latch or an adhesive.

5. The high-voltage inline connector of claim 1, wherein each of the first and second high-voltage connection interfaces comprises a flange arranged to locate an end connector of a high-voltage harness.

6. A vehicle comprising the high-voltage inline connector of claim 1.

7. The vehicle of claim 6 further comprising a first high-voltage component having an associated first harness and a second high-voltage component having an associated second harness, wherein the first and second high-voltage components are connected to each other by connecting the first harness to the first high-voltage connection interface and connecting the second to the second high-voltage connection interface.

8. The vehicle of claim 7, wherein the connection between the first harness and the first high-voltage connection interface is releasable.

9. A high-voltage inline connector, comprising:
a first high-voltage connection interface comprising first and second high-voltage pins and first and second high-voltage interlock pins,
a second high-voltage connection interface comprising third and fourth high-voltage pins and third and fourth high-voltage interlock pins, and
a high-voltage interlock connection interface;
wherein the first high-voltage pin is electrically connected to the third high-voltage pin, the second high-voltage pin is electrically connected to the fourth high-voltage pin, the first high-voltage interlock pin is electrically connected to the third high-voltage interlock pin, and the second and fourth high-voltage interlock pins are electrically connected to the high-voltage interlock connection interface;
wherein the high-voltage inline connector is formed in three parts, the three parts comprising:
a first header,
a second header, and
an inline connector body;
wherein the first header comprises the first high-voltage connection interface, the second header comprises the second high-voltage connection interface, and the connector body comprises the high-voltage interlock connection interface; and
wherein the first and second headers are attachable to the connector body, such that when attached the first and third high-voltage pins are within a first pin bore of the inline connector body and the second and fourth high-voltage pins are within a second pin bore of the connector body, wherein the first high-voltage pin directly contacts the third high-voltage pin in the first pin bore and the second high-voltage pin directly contacts the fourth high-voltage pin in the second pin bore.

10. The high-voltage inline connector of claim 9, wherein the first header further comprises a fifth high-voltage pin, the second header further comprises a sixth high-voltage pin, and the inline connector body comprises a third pin bore.

11. The high-voltage inline connector of claim 9, wherein each of the first and second headers comprise one or more high-voltage interlock pin bores, wherein each of the high-voltage interlock pins extends through one of the high-voltage interlock pin bores.

12. The high-voltage inline connector of claim 9, wherein each of the first and second high-voltage connection interfaces comprises a flange arranged to locate an end connector of a high-voltage harness.

13. An inline connector body for a high-voltage inline connector, the inline connector body comprising:
a first mounting point;
a second mounting point; and
a high-voltage interlock connection interface;
wherein:
the first mounting point is arranged to have a first header mounted thereon and the second mounting point is arranged to have a second header mounted thereon;
the first header comprises a first high-voltage connection interface comprising first and second high-voltage pins and first and second high-voltage interlock pins;
the second header comprises a second high-voltage connection interface comprising third and fourth high-voltage pins and third and fourth high-voltage interlock pins; and
when the first and second headers are mounted on the inline connector body, the first high-voltage pin is electrically connected to the third high-voltage pin, the second high-voltage pin is electrically connected to the fourth high-voltage pin, the first high-voltage interlock pin is electrically connected to the third high-voltage interlock pin, and the second and fourth high-voltage interlock pins are electrically connected to the high-voltage interlock connection interface;
wherein the first and second headers are attachable to the inline connector body, such that when attached the first and third high-voltage pins are within a first pin bore of the inline connector body and the second and fourth high-voltage pins are within a second pin bore of the inline connector body, wherein the first and third high-voltage pins are electrically connected via a first busbar located in the first pin bore, and the second and fourth high-voltage pins are electrically connected via a second busbar located in the second pin bore.

14. The inline connector body of claim 13, wherein each of the first and second headers comprise one or more high-voltage interlock pin bores, wherein each of the high-voltage interlock pins extends through one of the high-voltage interlock pin bores.

15. The inline connector body of claim 13, wherein the headers are connected to the inline connector by at least one of a bolt, rivet, over-centre clamp, latch or an adhesive.

16. The inline connector body of claim 13, wherein each of the first and second high-voltage connection interfaces comprises a flange arranged to locate an end connector of a high-voltage harness.

17. A vehicle comprising the inline connector body of claim 13.

18. The vehicle of claim 17, further comprising a first high-voltage component having an associated first harness and a second high-voltage component having an associated second harness, wherein the first and second high-voltage components are connected to each other by connecting the first harness to the first high-voltage connection interface and connecting the second to the second high-voltage connection interface.

19. The vehicle of claim 18, wherein the connection between the first harness and the first high-voltage connection interface is releasable.

20. The inline connector body of claim 13, wherein the first header further comprises a fifth high-voltage pin, the second header further comprises a sixth high-voltage pin, and the inline connector body comprises a third pin bore.

\* \* \* \* \*